(12) United States Patent
Whitehouse (10) Patent No.: US 10,063,051 B2
(45) Date of Patent: Aug. 28, 2018

(54) ELECTRICAL SOCKETS

(71) Applicant: Barry Foley, East Sussex (GB)

(72) Inventor: Philip Whitehouse, Northhamptonshire (GB)

(73) Assignee: Barry Foley, East Sussex (GB)

( * ) Notice: Subject to any disclaimer, the term of this patent is extended or adjusted under 35 U.S.C. 154(b) by 231 days.

(21) Appl. No.: 14/895,385

(22) PCT Filed: Jun. 6, 2014

(86) PCT No.: PCT/GB2014/051750
§ 371 (c)(1),
(2) Date: Dec. 2, 2015

(87) PCT Pub. No.: WO2014/195722
PCT Pub. Date: Dec. 11, 2014

(65) Prior Publication Data
US 2016/0149406 A1    May 26, 2016

(30) Foreign Application Priority Data

Jun. 7, 2013 (GB) .................................. 1310129.0

(51) Int. Cl.
*H02J 3/00* (2006.01)
*H01R 25/00* (2006.01)
(Continued)

(52) U.S. Cl.
CPC .............. *H02J 3/00* (2013.01); *H01R 25/006* (2013.01); *H01R 25/165* (2013.01); *H01R 35/04* (2013.01); *H02G 3/18* (2013.01); *H01R 24/76* (2013.01)

(58) Field of Classification Search
CPC ....... H02J 7/0021; H02J 9/02; F21Y 2115/10; F21Y 2103/10; F21Y 2105/16;
(Continued)

(56) References Cited

U.S. PATENT DOCUMENTS 5,350,310 A    9/1994 Chen
5,429,518 A    7/1995 Chen
(Continued)

FOREIGN PATENT DOCUMENTS

DE    20 2009 002 275 U1    5/2009
EP    0379662 A2    11/1989
(Continued)

OTHER PUBLICATIONS

United Kingdom Search Report dated Dec. 5, 2013.
(Continued)

*Primary Examiner* — John Poos
(74) *Attorney, Agent, or Firm* — Wood, Phillips, Katz, Clark & Mortimer (57) ABSTRACT

The present invention relates to a socket box. The socket box includes a base, a socket insert, a facia insert and an internal electrically conductive substrate. The socket insert comprises a body having an upper surface and a lower surface, wherein the upper surface is provided with a plurality of apertures which are sized and spaced so as to receive the pins of an electrical plug, and wherein further the lower surface is provided with a plurality of sprung electrical contacts. The socket insert and electrically conductive substrate are supported and held in spaced relationship to one another by the facia insert such that the sprung electrical contacts are compressed against the electrically conductive substrate, and wherein further the facia insert in turn is supported by the base.

19 Claims, 13 Drawing Sheets

(51) Int. Cl.
*H01R 25/16* (2006.01)
*H01R 35/04* (2006.01)
*H02G 3/18* (2006.01)
*H01R 24/76* (2011.01)

(58) Field of Classification Search
CPC ...... F21Y 2113/13; F21V 29/74; F21V 29/51; F21V 29/58; F21V 29/70; F21V 23/02
USPC .................................. 439/145, 650, 652
See application file for complete search history.

(56) References Cited

U.S. PATENT DOCUMENTS

| | | | | |
|---|---|---|---|---|
| 5,775,921 | A | * | 7/1998 | Chou ...................... H01R 39/64 439/21 |
| 5,967,815 | A | | 10/1999 | Schlessinger et al. |
| 6,015,307 | A | | 1/2000 | Chiu et al. |
| 6,302,743 | B1 | * | 10/2001 | Chiu ...................... H01R 25/003 439/22 |
| 7,665,997 | B1 | | 2/2010 | Lin |
| 7,740,484 | B1 | | 6/2010 | Chiang |
| 2007/0099458 | A1 | | 5/2007 | Gottstein |
| 2009/0023304 | A1 | | 1/2009 | Gerard |
| 2010/0317223 | A1 | | 12/2010 | Byrne |

FOREIGN PATENT DOCUMENTS

| | | |
|---|---|---|
| EP | 0379662 A3 | 11/1989 |
| GB | 2453914 A | 4/2009 |
| GB | 2458352 A | 9/2009 |

OTHER PUBLICATIONS

United Kingdom Search Report dated Nov. 13, 2014.
International Search Report and Written Opinion dated Aug. 28, 2014.

* cited by examiner

ELECTRICAL SOCKETS

The present invention relates to electrical sockets and in particular to the provision of multiple electrical sockets in a socket box.

It is known to provide arrangements of multiple electrical sockets, for example in an office environment. Taking the example of a desk in an office environment, there may be a requirement to provide sufficient sockets to provide electrical power to a computer, one or more monitors, a printer and/or scanner. Further sockets may be needed to provide power to, for example desk lighting and personal items such as mobile phones, tablet computers and PDAs. Typically, a plurality of sockets are provided in a socket box which may be located under the desk or attached to an edge of the desk.

According to the present invention there is provided a socket box including a base, a socket insert, a facia insert and an internal electrically conductive substrate, wherein the socket insert comprising a body having an upper surface and a lower surface, wherein in the upper surface is provided with a plurality of apertures which are sized and spaced so as to receive the pins of an electrical plug, wherein further the lower surface is provided with a plurality of sprung electrical contacts, the socket insert and electrically conductive substrate being supported and held in spaced relationship to one another by the facia insert such that the sprung electrical contacts are compressed against the electrically conductive substrate, wherein further the facia insert in turn is supported by the base.

The body of the socket insert may be substantially cylindrical and comprised of an upper shell and a lower shell which are connected to one another by a plurality of interengagable formations. The socket insert may be provided with at least two sprung electrical contacts that are held in compression against the electrically conductive substrate. The socket insert may be provided with three sprung electrical contacts. In such an embodiment the socket insert may be provided with a first contact positioned at a substantially central position, a second contact positioned at a first radial distance from the central position, and a third contact positioned a second radial distance from the central position, wherein the second radial distance is greater than the first radial distance.

So as to provide flexibility of installation of the socket box, it is desirable to allow some form of positional adjustability of the sockets relative to the socket box during or after manufacture of the socket box. This allows the sockets to be positioned such that cables leading from plugs fitted to the sockets can be routed away from and/or around obstructions such as, for example, parts of the desk to which the socket box is fitted.

The socket insert may be rotationally fixed with respect to the facia insert. The body of the socket insert may be provided with a plurality of formations around the periphery thereof, said formations enabling the socket insert to be fixed at one of a plurality of rotational positions with respect to the facia insert.

In an alternative embodiment, the socket insert may be supported for rotation relative to the facia insert. In such an embodiment the socket may be rotatable through an arc of less than 360 degrees. Alternatively, the socket insert may be freely rotatable relative to the facia insert.

The facia insert may be slidably received in the base. In such an embodiment lateral projections of the facia insert may be received in opposed complementary formations of the base. Said opposed complementary formations may be slots provided in opposed walls of the base.

The socket box may be provided with a plurality of socket inserts. Each socket insert may be supported either in a separate facia inserts or alternatively may be supported in a common facia insert with multiple apertures.

In such an embodiment the socket inserts are connected to a single electrically conductive substrate supported by the or each facia insert.

Embodiments of the present invention will now be described with reference to the accompanying drawings in which.

Referring to the figures there is shown a socket box generally designated 10. The socket box 10 includes a channel shaped body 12 having opposed end plates 14, 16, and four substantially circular socket inserts 18. Each socket insert 18 is located to the body 12 by a facia insert 20 as will be described in greater detail below.

The end plates 14, 16 are connected to the body 12 by threaded fasteners 22 which extend through apertures 24 of the end plate 14, 16. Each aperture 24 aligns with an interior formation of the body 12 which is described in greater detail below. The threaded fasteners engage with the interior formations in order to secure the end plates 14, 16 to the body 12.

Each end plate 14, 16 is further provided with an electrical connector 26. One of these connectors 26, in use, permits the socket box 10 to be connected to a power supply via an appropriately configured cable. The provision of a second electrical connector 36 at an opposite end of the socket box 10 optionally enables additional socket boxes 10 to be connected in series to the first socket box 10.

In the embodiment shown, the socket box 10 is provided with four socket inserts 18. It will be understood that this number of socket inserts 18 is provided for the purpose of illustrating the invention and is not intended to be limiting. For example, the socket box 10 may be provided with as few as one socket insert 18 or, alternatively, more than four socket inserts 18. It will further be noted that the socket inserts 18 of the embodiment are all aligned in the same direction. This again is purely illustrative and is not intended to be limiting. As will be described in greater detail below, the relative configurations of the socket inserts 18 and facia inserts 20 is such that the rotational position of a socket insert relative to a facia insert 210 can be set during manufacture of the socket box 10.

The body 12 of the socket box 10 is of unitary construction and has a base 28 from which opposed sidewalls 30 extend in a substantially perpendicular direction from the base 28. The body 12 is preferably formed by extrusion from a lightweight alloy, for example aluminium alloy. It will thus be appreciated that the body 12 can be of any desired length. Each sidewall 30 is provided with two separate longitudinally extending channel formations 32, 34. These channel formations 32, 34 are provided on the interior of the body 12 such that the channel formations 32, 34 of one sidewall 30 face the channel formations of the opposite wall 30.

The channel formations 32, 34 comprise an upper, substantially "U" shaped channel formation 32 and a lower, substantially "C" shaped channel formation 34. The upper channel formation 32 is provided at the distal end 36 of the sidewall 30, which is to say the end of the sidewall 30 furthest from the base 28. The upper channel formation 32 is configured to receive and support a portion of facia insert 20 as will be described in greater detail below. The lower channel formation 34 is positioned on the sidewall 30 approximately midway between the base 28 and the sidewall distal end 36. The lower channel formation 34 defines the aforementioned interior formations of the body 12 to which the threaded fasteners 22 are engaged. The threaded fasteners 22 may, for example, comprise self tapping screws.

Figure 9:
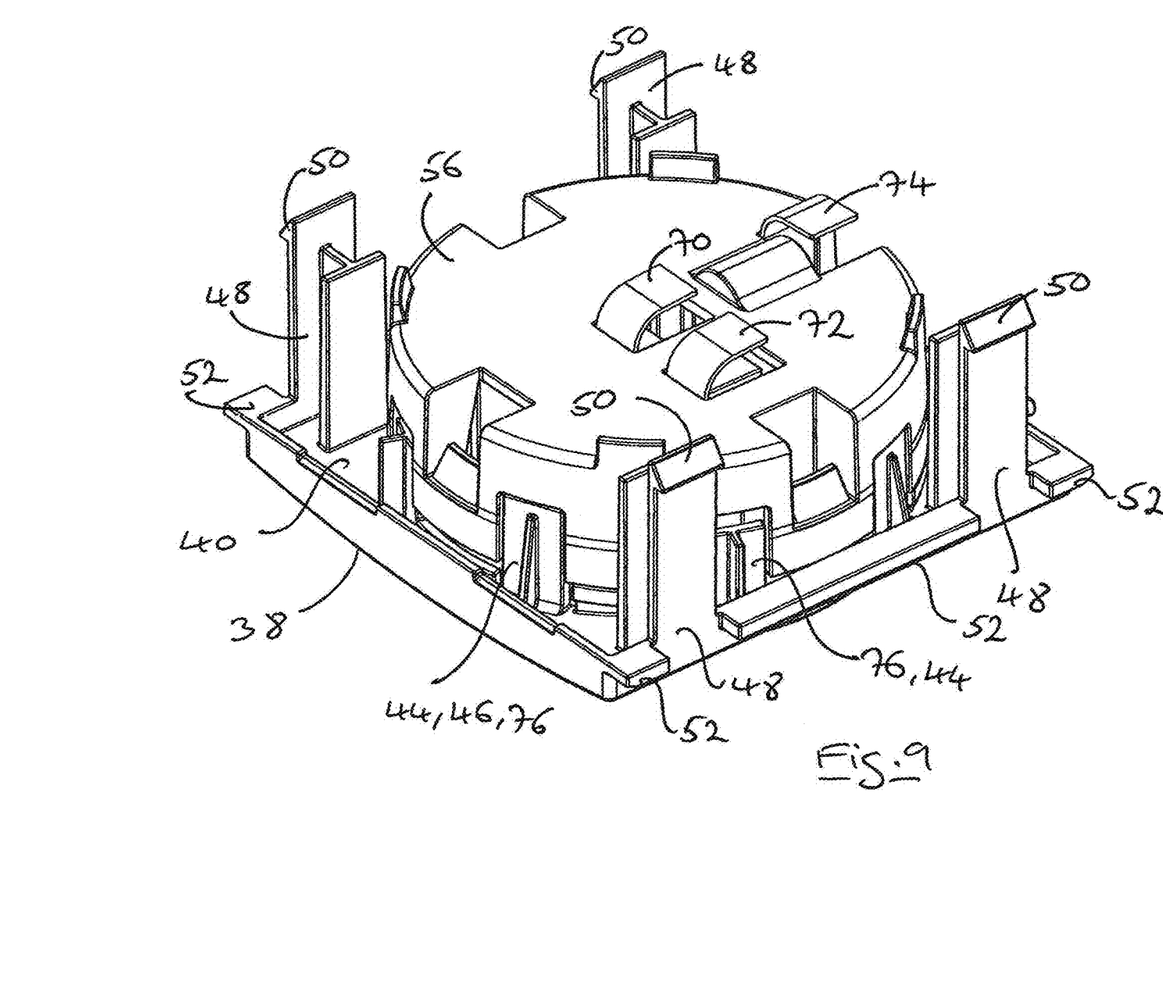
FIG. 9 shows the socket insert and facia of FIG. 8 in an engaged condition.

Each facia insert 20 comprises a plastic injection moulded item having an upper face 38 and lower face 40. The facia insert 20 is further provided with a central hole 42 which extends between the upper and lower faces 38, 40. The diameter of the central hole 42 is slightly greater than the outer diameter of a socket insert 18, such that a socket insert 18 may be received within the central hole 42 with a slight clearance therearound. On the inner face side of the facia insert 20 the central hole 42 is surrounded by eight equidistantly spaced fingers 44. Every other finger 44 is provided with a barb 46. In use, and as can be seen in FIG. 9, the barbs 46 can engage complementarily shaped formations of a socket insert 18. This functionality will be described in greater detail below. In the embodiment shown, each socket insert 18 is associated with an individual facia insert 20. It will be appreciated that other configurations are possible. For example, a single facia insert may be provided with has multiple holes for multiple socket inserts.

The facia insert 20 further provided with four further fingers 48 each terminating at a barb 50. The further fingers 48 are longer than the eight fingers 44 surrounding the central aperture 42. The further fingers 48 are provided in pairs at opposed edges of the facia insert 20. As will be described in greater detail below, the further fingers and barbs 48, 50 are receivable in complementary formations of a printed circuit board 78.

Figure 6:
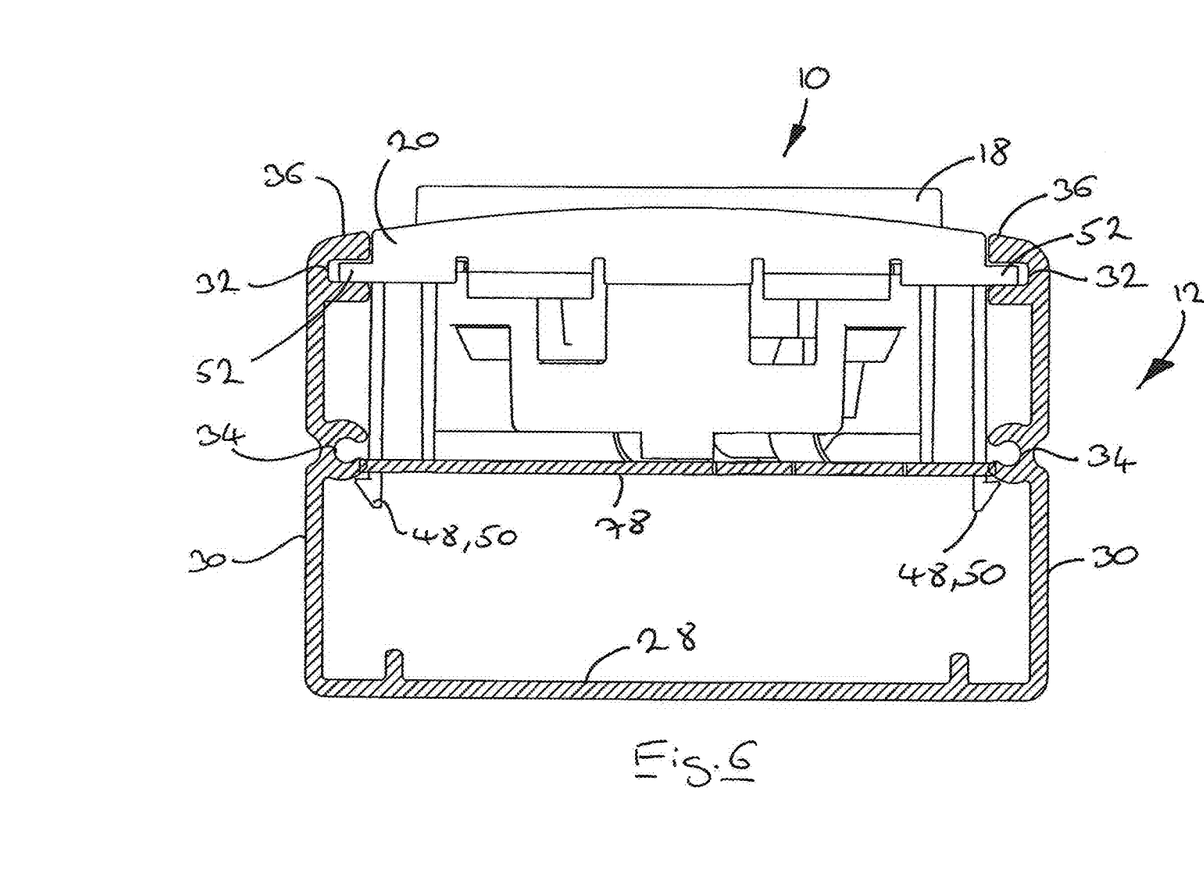
FIG. 6 shows a cross-sectional view of the socket box of FIG. 1.
Figure 7:
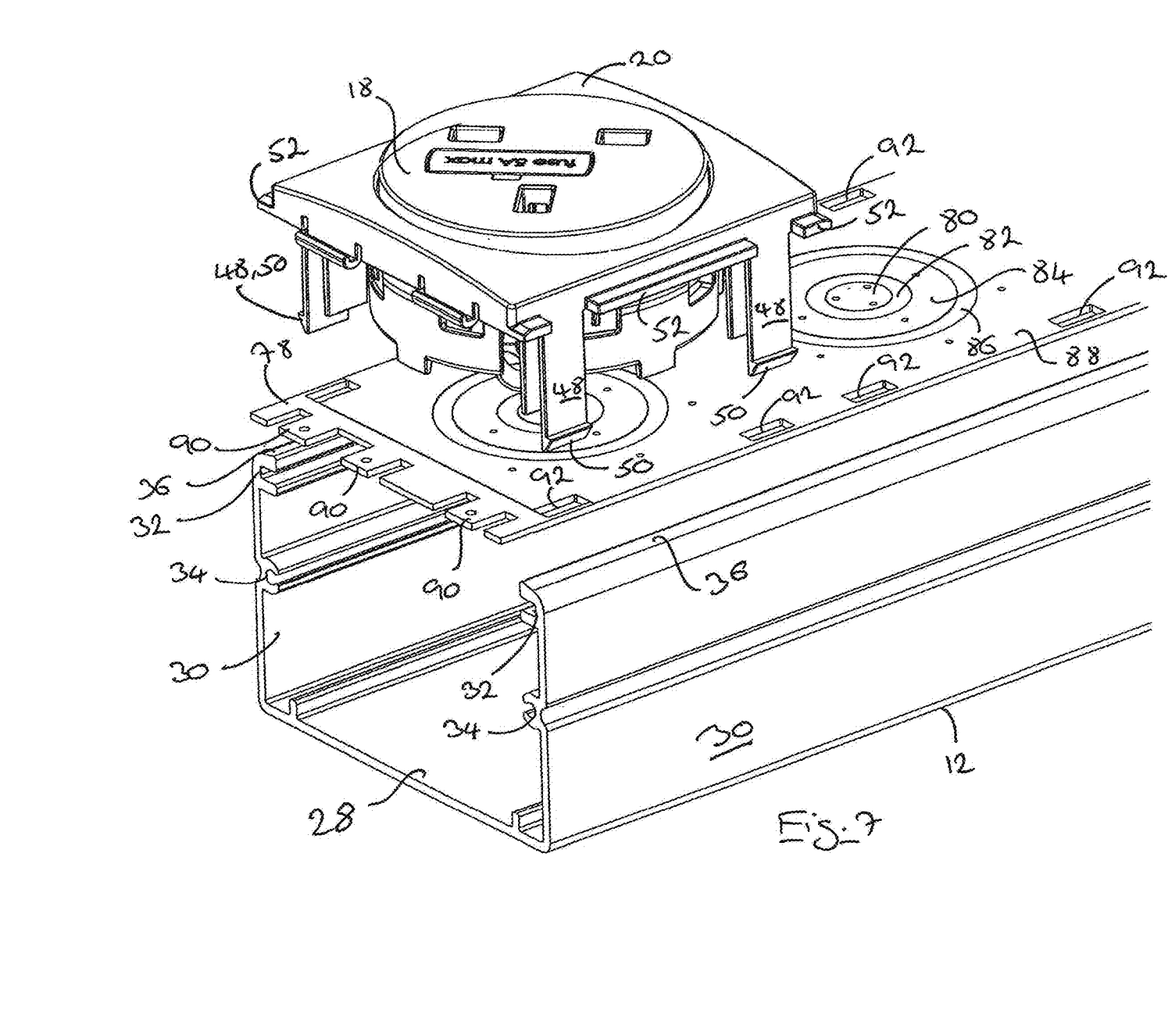
FIG. 7 shows a partial exploded view of the socket box of FIG. 1.
Figure 8:
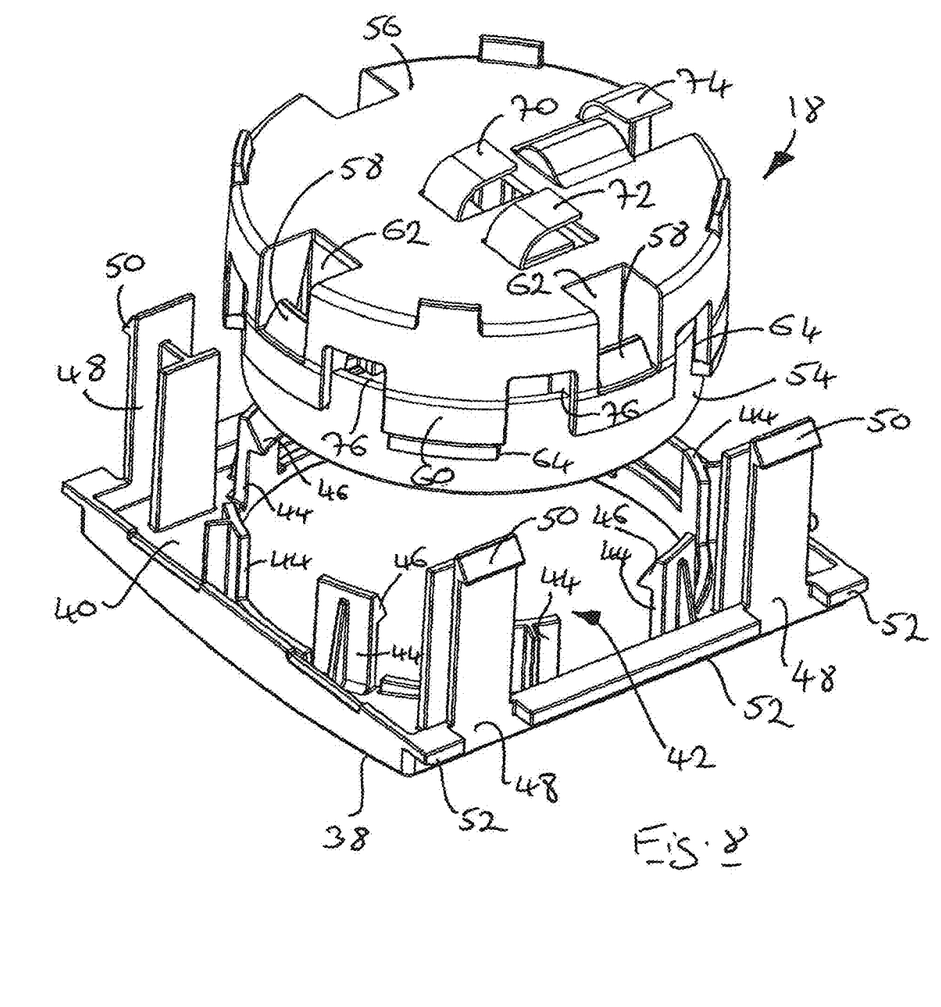
FIG. 8 shows a socket insert and facia of the socket box of the present invention in a disengaged condition.

The facia insert 20 is further provided with opposed sets of lateral projections 52. As can be seen in FIG. 6, the lateral projections 52 are receivable in upper channel formations 32 of the body 12 in order to locate the facia insert 20 to the body 12.

Each socket insert 18 generally cylindrical and is comprised of an upper half shell 54 and a lower half shell 56. The upper and lower half shells 54, 56 are joined by respective barbed projections 58, 60 of each half shell 54, 56 being received in corresponding recesses 62, 64 of the other of the half shells 54, 56. Upper half shell 54 is provided with three pin apertures 66. In the embodiment shown, the pin apertures 66 are of a three pin configuration corresponding to the type of plug used in the United Kingdom and the Republic of Ireland. It will be appreciated that the socket inserts 18 of the present invention may be provided with different pin aperture configurations in order to accommodate different types of plugs. The upper half shell 54 is further provided with a fuse cover 68.

The lower half shell 56 is provided with a plurality of sprung contacts. These comprise a live contact 70, a neutral contact 72 and an earth contact 74. The live contact 70 is provided substantially centrally on the lower half shell 56. The neutral contact 72 is provided at a first radial distance from the centre of the lower half shell 56. The earth contact 74 is provided at a second radial distance from the centre of the lower half shell 56. The second radial distance is greater than the first radial distance.

Defined between the upper and lower half shells 54, 56 are eight apertures 76 which are equidistantly spaced around the periphery of the socket insert 18. The apertures 76, in use, receive the barbed arms 44, 46 of the facia insert 20. It will thus be appreciated that a socket insert 18 can therefore be fixed relative to a facia insert 12 in one of eight rotational positions. In an alternative embodiment, not shown, the socket insert 18 may be supported for rotation by the facia insert 20. For example, the socket insert 18 may be rotatable through a limited arc relative to the facia insert 20. Alternatively, the socket insert 18 may be freely rotatable relative to the facia insert 20.

The socket box 10 is further provided with an internal, electrically conductive substrate, This takes the form of a printed circuit board (PCB) 78 which enables the sprung contacts of 70, 72, 74 of the socket inserts 18 to be connected to the connectors 26 of the socket box 10.

The PCB 78 is provided with a plurality of electrically conductive regions which, in use, align with the sprung contacts 70, 72, 74 of the socket inserts 18. For each socket insert 18 there is provided circular conductive region 80. This is aligned with the live sprung contact 70 of the socket insert 18. The circular conductive region 80 is dimensioned such that the live sprung contact 70 remains in electrically conductive contact with the circular conductive region 80 at all rotational positions of the socket insert 18.

The circular conductive region 80 is surrounded by first annular non-conductive region 82. The first annular non-conductive region 82 is itself surrounded by an annular conductive region 84. This region 84 is aligned with the neutral contact 72 of the socket insert 18. The annular conductive region 84 is dimensioned such that the neutral sprung contact 72 remains in electrically conductive contact with the annular conductive region 84 at all rotational positions of the socket insert 18.

The annular conductive region 84 is surrounded by a second annular non-conductive region 86. The second annular non-conductive region 86 is itself surrounded by a third conductive region 88. This region 88 is aligned with the earth contact 74 of the socket insert 18. The third conductive region 88 is dimensioned such that the earth sprung contact 74 remains in electrically conductive contact with the third conductive region 88 at all rotational positions of the socket insert 18.

Figure 1:
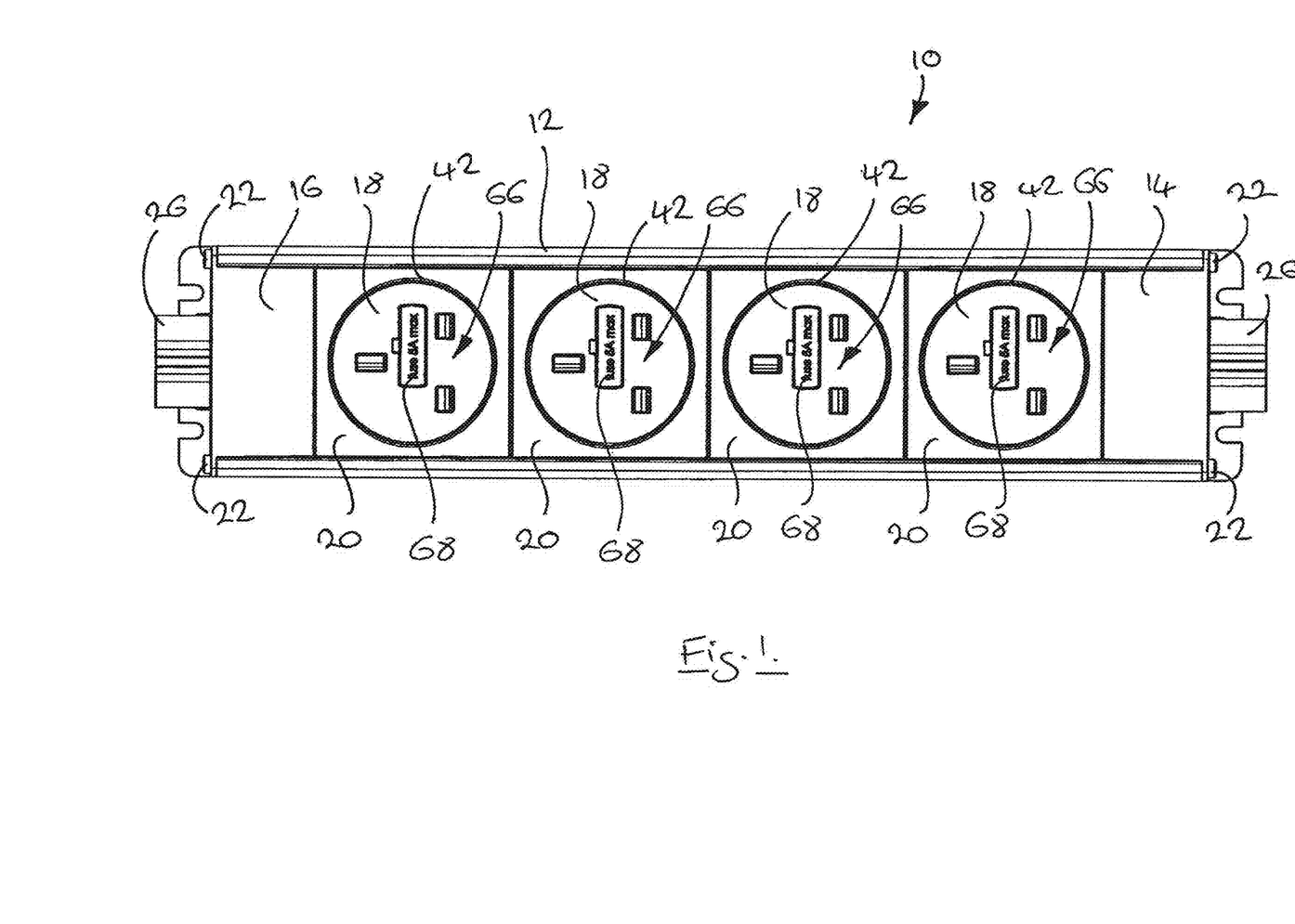
FIG. 1 shows a top plan view of a socket box according to a first embodiment of the present invention.
Figure 2:
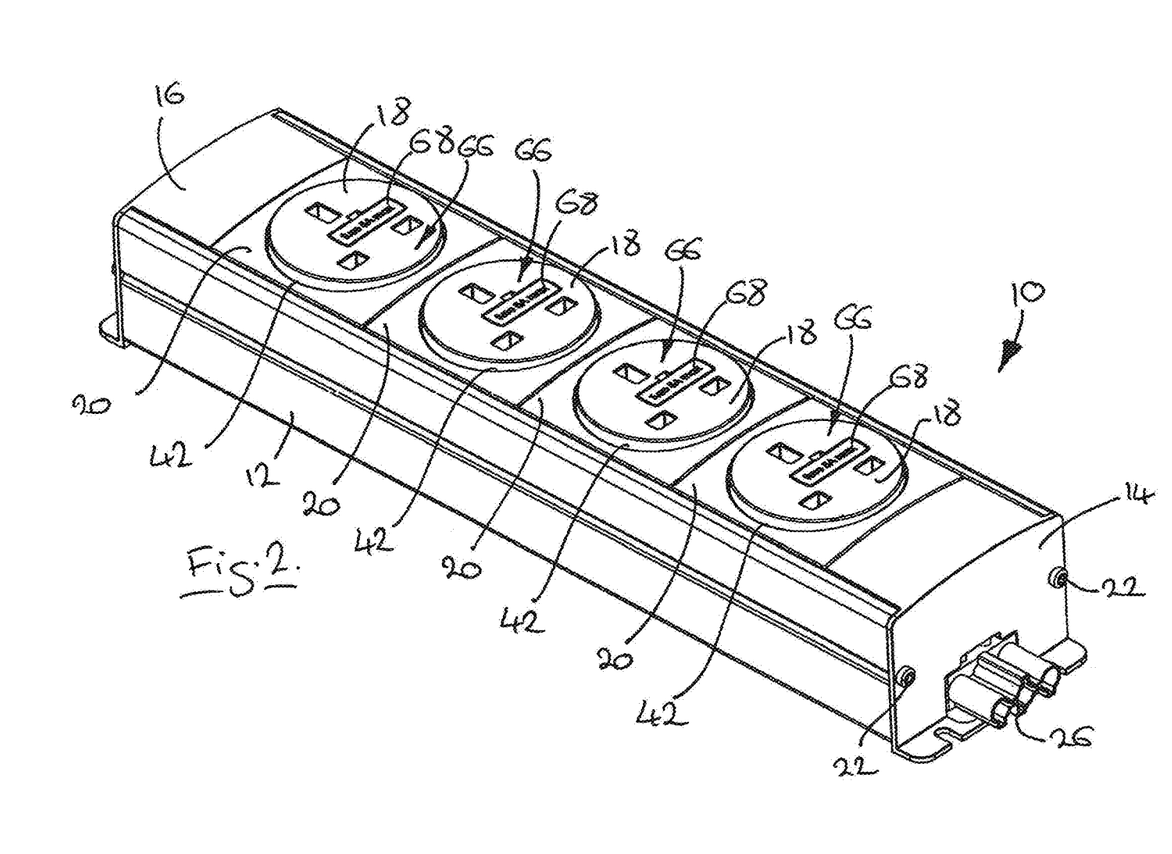
FIG. 2 shows a perspective view from above and to one side of the socket box of FIG. 1.
Figure 3:
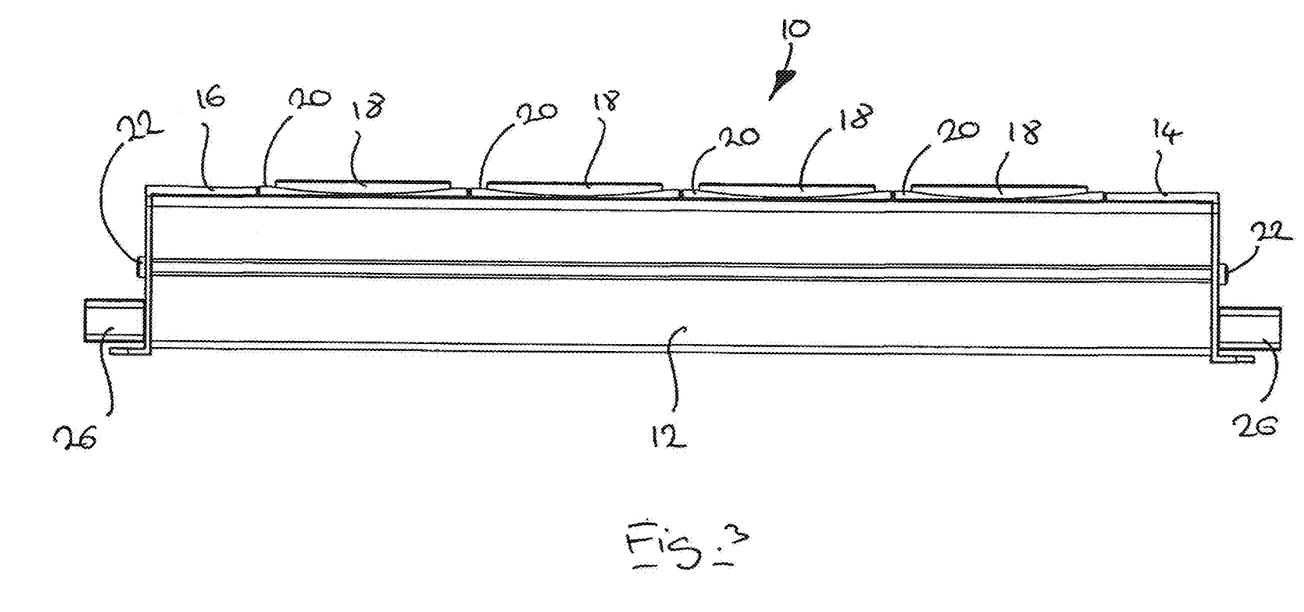
FIG. 3 shows a side view of the socket box of FIG. 1.
Figure 4:
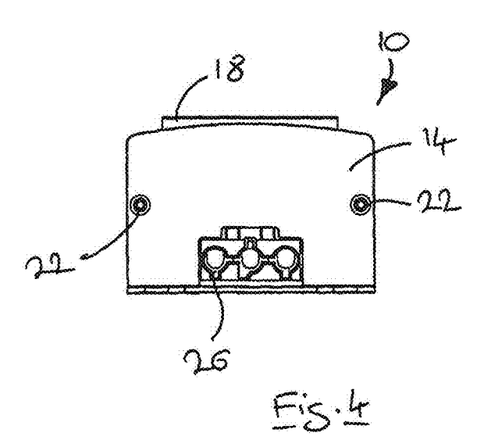
FIG. 4 shows an end view of the socket box of FIG. 1.
Figure 5:
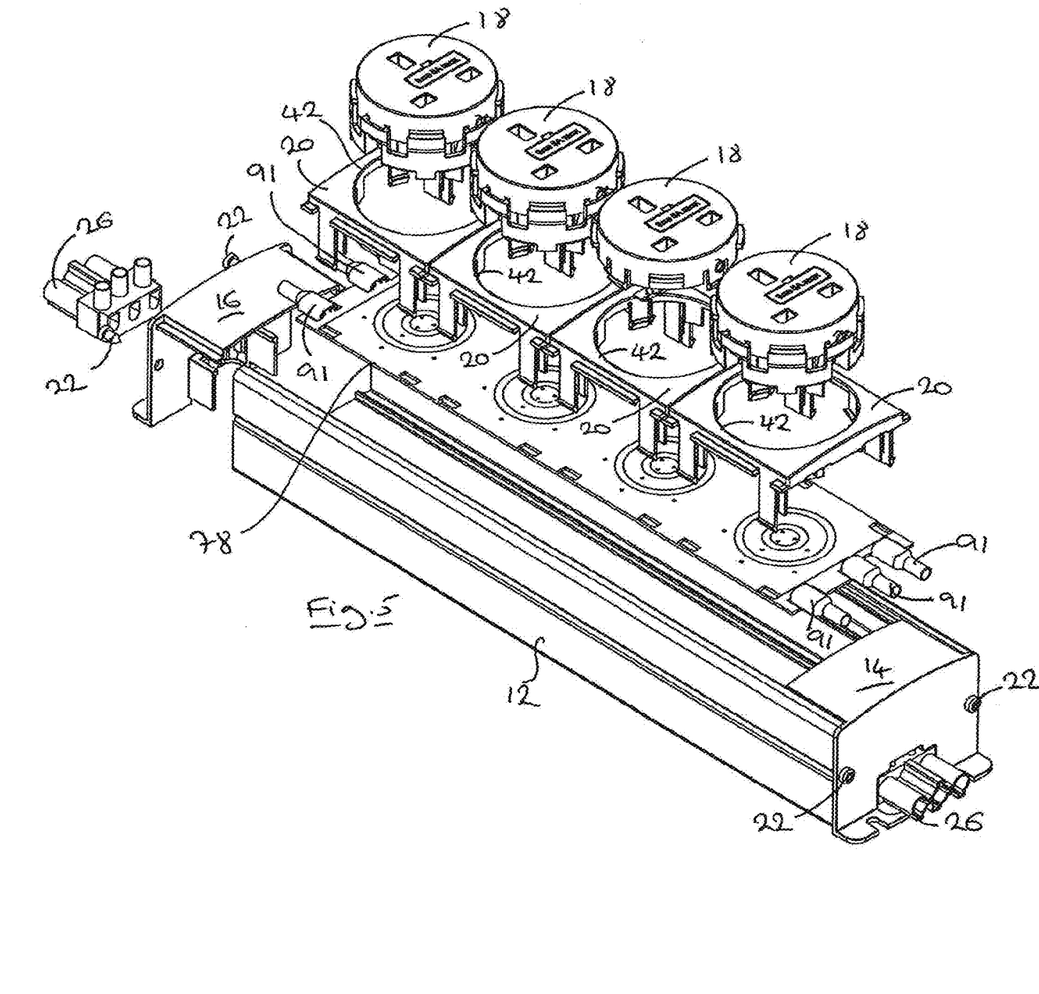
FIG. 5 shows an exploded view of the socket box of FIG. 1.

The PCB 78 is further provided at each end with three connector projections 90. The connector projections 90 permit the conductive regions 80, 84, 88 of the PCB 78 to be connected to the socket box connectors 26 by the use of appropriate internal wiring. FIG. 5 shows connector members 91 fitted to the connector projections 90. In use, wiring (not shown) extends between the connector members 91 and the socket box connectors 26. The PCB 78 is further provided with a plurality of through apertures 92 which, in use, receive the longer second fingers and barbs 48, 50 of the facia inserts. It will thus be appreciated that the PCB 78 is supported in the body by the or each facia insert 20. It will further be appreciated that the or each socket insert 18 is also supported by a facia insert 20 and thus the facia inserts 20 hold the socket inserts 18 and PCB 78 in spaced relation to one another. The spacing of the socket inserts 18 and PCB 78 by the facia inserts 20 is such that the sprung contacts 70,72,74 are compressed, thereby ensuring adequate electrical contact between the sprung contacts 70,72,74 and the conductive regions of the PCB 78.

The PCB 78 may be rigid. Alternatively, the PCB 78 may be flexible. In a preferred embodiment, the PCB 78 may be supplied in lengths that can be cut down to suit the desired number of socket inserts 18 to be included in a given socket box 10. Where the PCB 78 is flexible, the PCB 78 may be supplied on a roll that can be cut to length. In such an embodiment it will be understood that the PCB 78 is provided with a repeating pattern of conductive and non-conductive regions. The pattern of conductive and non-conductive regions described above with reference to the accompanying drawings is given by way of example only. It will be understood that other patterns may be used. The pattern of the conductive regions of the PCB must however correspond to the positions of the sprung contacts 70, 72, 74 of the or each socket insert 18 at each possible rotational position of an insert 18 relative to a fascia insert 20.

The present invention provides a modular system whereby socket boxes can easily and rapidly assembled to meet the requirements and specifications of a user. The rotational position of the or each socket insert 18 relative to its respective fascia insert 20 can be set during manufacture. The appropriate lengths of both the channel shaped body 12 and PCB 78 can be cut or otherwise formed to suit the number of socket insert 18 and facia insert 20 assemblies required in a given configuration of socket box 10. It will further be appreciated that the socket insert 18 and PCB 78 sub assembly can be inspected and tested before being located into body 12 Socket boxes according to the present invention may, in use, be located under the desk or attached to an edge of the desk, or incorporated into a work surface.

Figure 10:
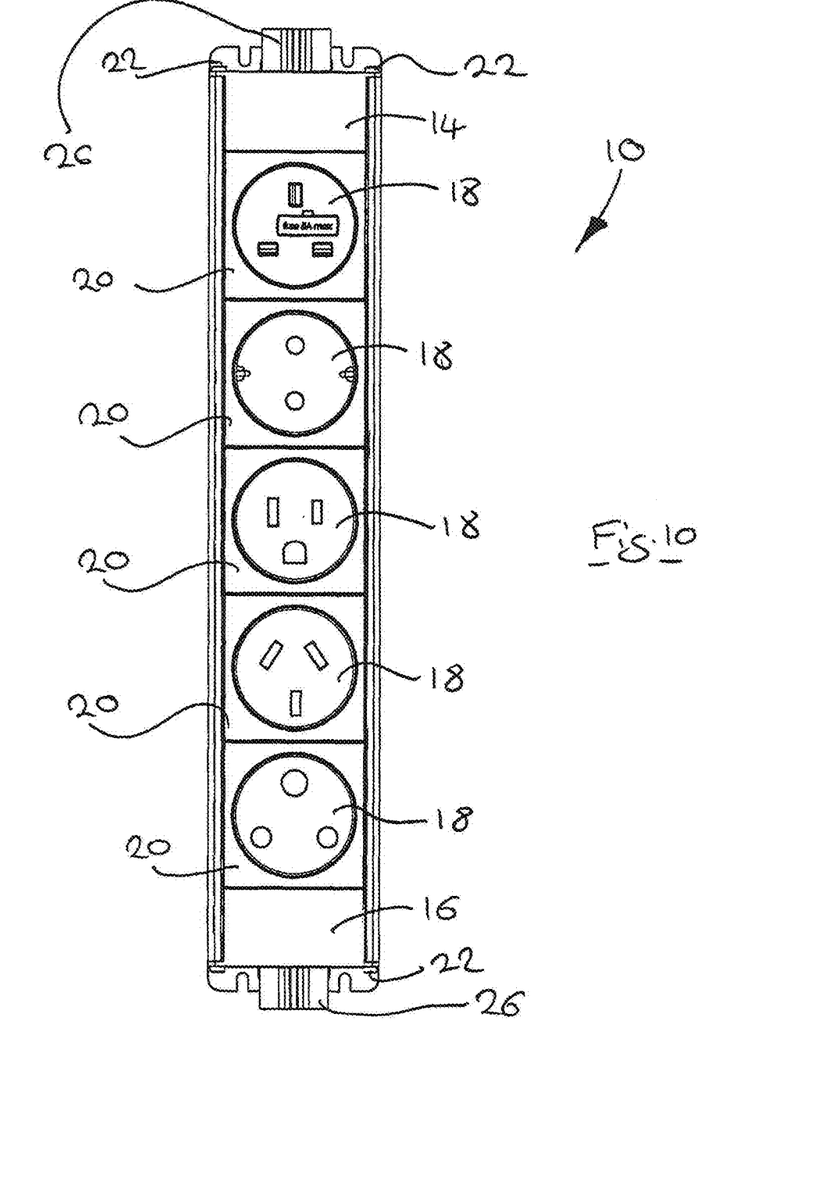
FIG. 10 shows a plan view of a socket box having a plurality of differently configured socket inserts.

While the embodiment of the invention described above is shown with a UK style three pin socket insert, it will be understood that different socket insert types may be used, FIG. 10 shows a socket box 10 having a plurality of different two and three pun socket inserts. The socket inserts are configured in the same manner described above in that each of the pin apertures is associated with a sprung contact that is in electrically conductive communication with a portion of the substrate.

Figure 11:
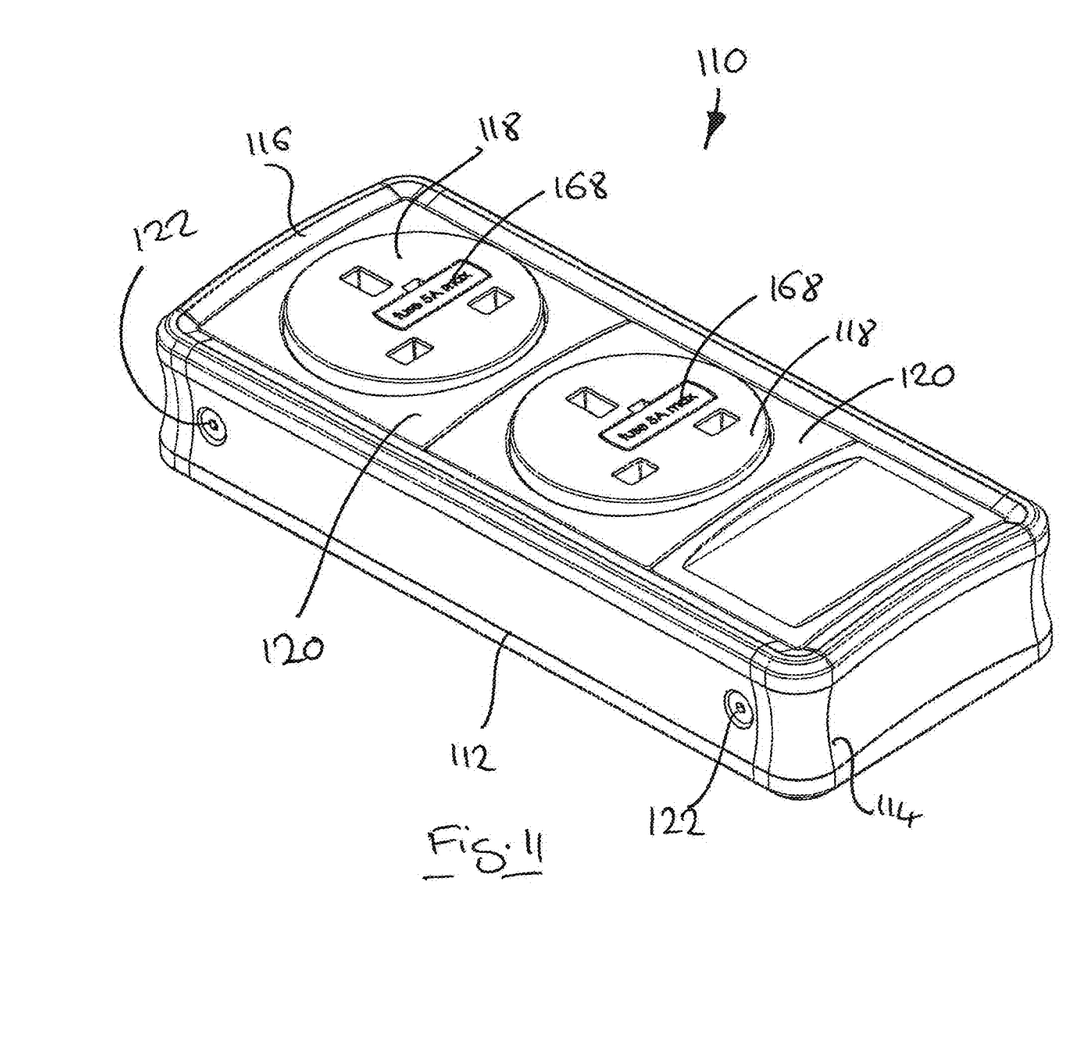
FIG. 11 shows a perspective view of a socket box according to a further embodiment of the present invention.
Figure 12:
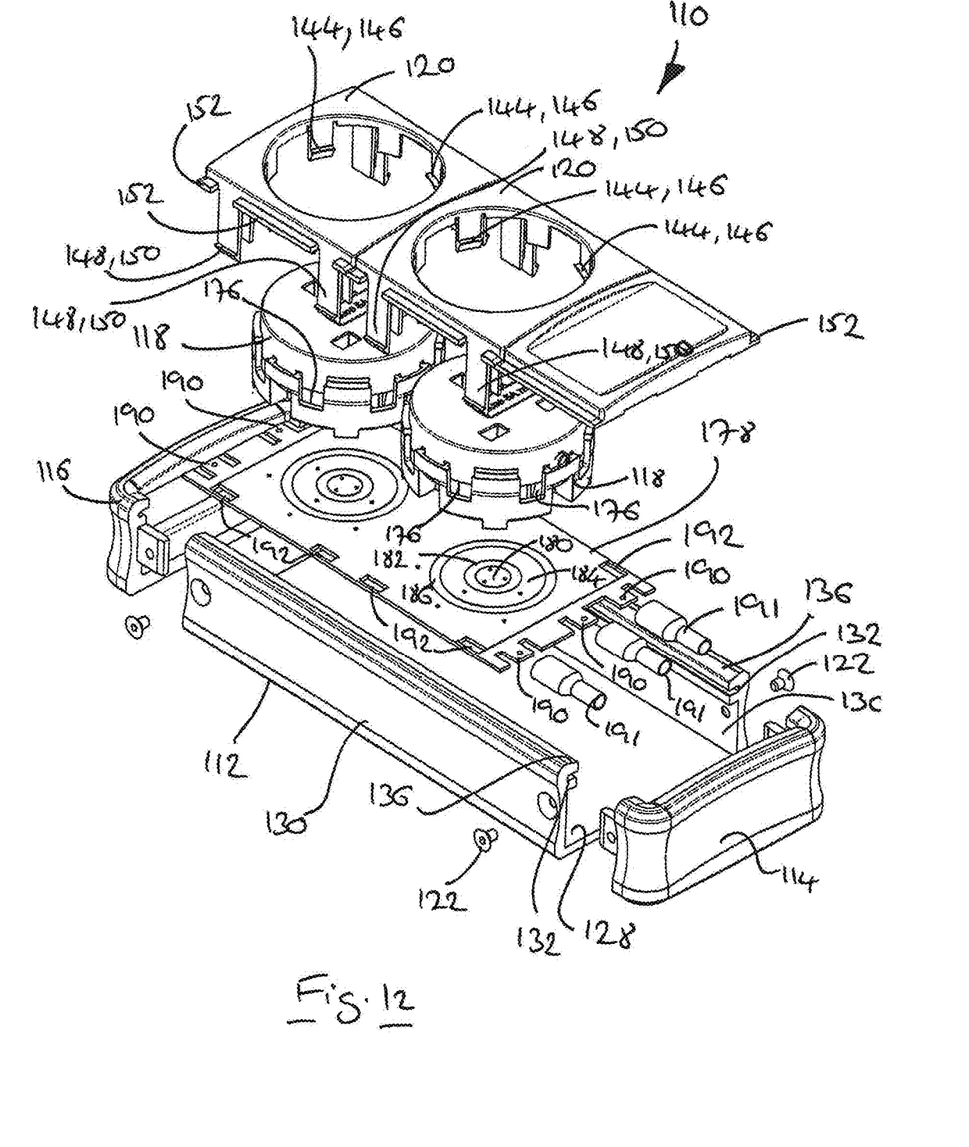
FIG. 12 shows an exploded view of the socket box of FIG. 11.
Figure 13:
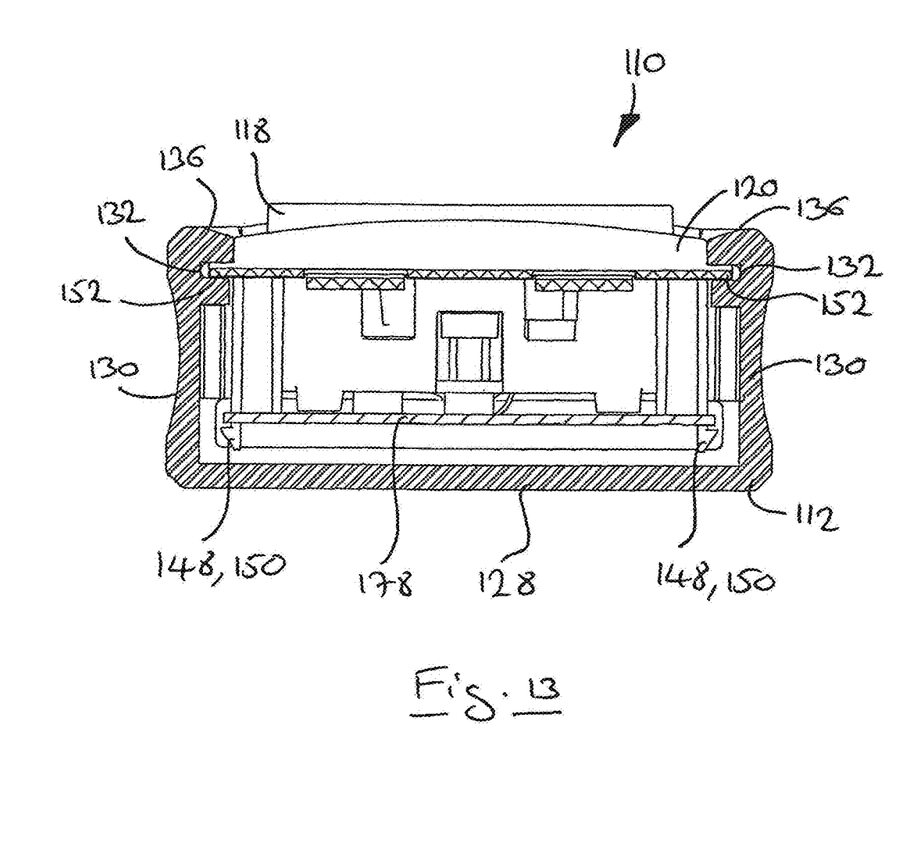
FIG. 13 shows a cross-sectional view of the socket box of FIG. 11.

Referring now to FIGS. 11 to 13 there is shown an alternative socket box generally designated 110. Features common to the embodiment of the socket box described with reference to FIGS. 1 to 9 are identified with like reference numerals prefixed with a "1".

One manner in which the socket box 110 differs is that the sidewalls 130 of the body 112 are of a reduced height compared to the sidewalls 30 of the embodiment of the socket box 10 shown in FIGS. 1 to 9. This allows a more "slimline" socket box 130 to be provided. The internal structure of the socket box 110 remains essentially the same as that described with reference to FIGS. 1 to 9. The socket inserts 118 are received and supported in respective facia inserts 120. The socket inserts 118 are further rotationally fixed relative to the facia inserts 120 by the engagement of barbed arms 144,146 of the facia inserts 120 with apertures 176 of the socket inserts 118. A PCB 178 having electrically conductive regions 180,184,188 is connected to the facia inserts 120 by barbed fingers 148,150 which are received in through apertures 192 of the PCB 178. Sprung fingers provided on the underside of each socket insert 118 are this pressed against the electrically conductive regions 180,184, 188. The socket insert/facia insert/PCB sub assembly is retained in the body 112 by lateral projections 152 of the facia inserts 120 being received in opposed upper channel formations 132 of the body 112.

The invention claimed is:

1. A socket box comprising:
   a base:
   at least one socket insert having an upper surface and a lower surface, wherein the upper surface is provided with a plurality of apertures which are sized and spaced so as to receive the pins of an electrical plug, and the lower surface is provided with a plurality of sprung electrical contacts;
   a facia insert having an upper face with at least one opening therethrough, said facia insert being secured to said base with said socket insert fixed to said facia insert in said facia insert opening with said socket insert lower surface spaced beneath said facia insert upper face;
   a first set of barbed fingers fixed to said facia insert and extending down from said facia insert upper face; and
   an internal electrically conductive substrate secured to said facia insert beneath said socket insert by said first set of barbed fingers which limit the spacing of said electrically conductive substrate from said facia insert upper face;
   whereby said socket insert and electrically conductive substrate are secured in a spaced relationship to one another by the facia insert such that the sprung electrical contacts are compressed against the electrically conductive substrate.

2. The socket box as claimed in claim 1 wherein the socket insert is substantially cylindrical and is comprised of an upper shell and a lower shell which are connected to one another by a plurality of interengageable formations.

3. The socket box as claimed in claim 1 wherein the socket insert is supported for rotation relative to the facia insert.

4. The socket box as claimed in claim 3 wherein the socket insert is rotatable through an arc of less than 360 degrees relative to the facia insert.

5. The socket box as claimed in claim 3 wherein the socket insert is freely rotatable about a vertical axis relative to the facia insert, said socket insert being fixed relative to said facia insert in the vertical direction.

6. The socket box as claimed in claim 1 wherein the facia insert is slidably received in the base.

7. The socket box as claimed in claim 6 wherein opposed edges of the facia insert are slidably received in opposed slots of the base.

8. The socket box as claimed in claim 1 wherein the socket box is provided with a plurality of socket inserts.

9. The socket box as claimed in claim 8 wherein each socket insert is supported by a separate facia insert.

10. The socket box as claimed in claim 8 wherein the plurality of socket inserts are supported by a common facia insert.

11. The socket box as claimed in claim 1 wherein said socket inserts are connected to a single electrically conductive substrate supported by the facia insert.

12. A socket box comprising:
    a base;

a facia insert secured to said base and having an upper face with at least one opening therethrough, said facia insert further having a first set of barbed fingers and a second set of barbed fingers, said first set of barbed fingers extending further beneath said facia insert upper face than said second set of barbed fingers;

at least one socket insert having an upper surface and a lower surface, wherein
- the upper surface is provided with a plurality of apertures which are sized and spaced so as to receive the pins of an electrical plug,
- the lower surface is provided with a plurality of sprung electrical contacts, and
- said socket insert is fixed in said facia insert opening by said second set of barbed fingers with said socket insert lower surface spaced beneath said facia insert upper face; and an internal electrically conductive substrate secured to said facia insert beneath said socket insert by said first set of barbed fingers which limit the spacing of said electrically conductive substrate from said facia insert upper face;

whereby said socket insert and electrically conductive substrate are secured in a spaced relationship to one another by the facia insert such that the sprung electrical contacts are compressed against the electrically conductive substrate.

13. The socket box as claimed in claim 12, wherein said socket insert and said facia insert opening are substantially cylindrical around a vertical axis, and said second set of barbed fingers are spaced around said facia insert opening whereby said socket insert is selectively securable to said facia insert in different rotational positions around said vertical axis.

14. The socket box as claimed in claim 12 wherein the socket insert is provided with at least two sprung electrical contacts.

15. The socket box as claimed in claim 12 wherein the socket insert is provided with three sprung electrical contacts.

16. The socket box as claimed in claim 15 wherein the socket insert is provided a first contact positioned at a substantially central position, a second contact positioned at a first radial distance from the central position, and a third contact positioned a second radial distance from the central position, wherein the second radial distance is greater than the first radial distance.

17. The socket box as claimed in claim 12 wherein the socket insert is rotationally fixed with respect to the facia insert.

18. The socket box as claimed in claim 17 wherein the body of the socket insert is provided with a plurality of formations around the periphery thereof adapted to receive the second set of barbed fingers, said formations enabling the socket insert to be fixed at one of a plurality of rotational positions with respect to the facia insert during assembly of the socket box.

19. The socket box as claims in claim 18 wherein said socket insert may be inserted through said facia insert opening from the side of said facia insert upper face whereby said second set of barbed fingers snap into said formations when said socket insert is in a selected one of said positions to fix said socket insert to said facia insert.

* * * * *

UNITED STATES PATENT AND TRADEMARK OFFICE
CERTIFICATE OF CORRECTION

PATENT NO.         : 10,063,051 B2
APPLICATION NO.    : 14/895385
DATED              : August 28, 2018
INVENTOR(S)        : Philip Whitehouse It is certified that error appears in the above-identified patent and that said Letters Patent is hereby corrected as shown below:

In the Claims

Claim 1, (Column 6, Line 12), after "base" delete ":" and substitute therefor ";".

Signed and Sealed this
Ninth Day of October, 2018

Andrei Iancu
*Director of the United States Patent and Trademark Office*